US006968416B2

(12) United States Patent
Moy

(10) Patent No.: US 6,968,416 B2
(45) Date of Patent: Nov. 22, 2005

(54) METHOD, SYSTEM, AND PROGRAM FOR PROCESSING TRANSACTION REQUESTS DURING A PENDENCY OF A DELAYED READ REQUEST IN A SYSTEM INCLUDING A BUS, A TARGET DEVICE AND DEVICES CAPABLE OF ACCESSING THE TARGET DEVICE OVER THE BUS

(75) Inventor: Andrew Moy, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 431 days.

(21) Appl. No.: 10/077,104

(22) Filed: Feb. 15, 2002

(65) Prior Publication Data

US 2003/0158994 A1 Aug. 21, 2003

(51) Int. Cl.[7] .............................................. G06F 13/36
(52) U.S. Cl. ...................... 710/310; 710/311; 710/309; 710/313; 710/112; 710/39
(58) Field of Search ................................ 710/305–306, 710/309–311, 314, 113, 36–39, 43, 104–112, 710/308–315, 52–57, 118, 125, 240–244

(56) References Cited

U.S. PATENT DOCUMENTS

| 4,760,553 | A | | 7/1988 | Buckley et al. |
| 5,634,037 | A | | 5/1997 | Sasaki et al. |
| 5,764,929 | A | | 6/1998 | Kelley et al. |
| 5,832,241 | A | | 11/1998 | Guy et al. |
| 5,850,530 | A | | 12/1998 | Chen et al. |
| 5,870,567 | A | * | 2/1999 | Hausauer et al. ........... 710/310 |
| 5,970,069 | A | | 10/1999 | Kumar et al. |
| 5,987,555 | A | | 11/1999 | Alzien et al. |
| 6,016,525 | A | | 1/2000 | Corrigan et al. |
| 6,018,810 | A | | 1/2000 | Olarig |
| 6,026,461 | A | | 2/2000 | Baxter et al. |
| 6,078,976 | A | | 6/2000 | Obayashi |
| 6,212,590 | B1 | | 4/2001 | Melo et al. |
| 6,233,641 | B1 | * | 5/2001 | Graham et al. ............. 710/316 |
| 6,279,087 | B1 | * | 8/2001 | Melo et al. ................. 711/146 |
| 6,327,636 | B1 | * | 12/2001 | Guthrie et al. .............. 710/119 |
| 6,351,784 | B1 | * | 2/2002 | Neal et al. ................... 710/308 |
| 6,385,686 | B1 | * | 5/2002 | Brown ........................ 710/313 |
| 6,412,030 | B1 | * | 6/2002 | Adusumilli .................. 710/33 |
| 6,449,678 | B1 | * | 9/2002 | Batchelor et al. ........... 710/310 |

(Continued)

OTHER PUBLICATIONS

PCI Bridges, "21154 Transparent PCT-to-PCI Bridge" [online], 2002, pp. 1-4. [Retrieved on Feb. 15, 2002]. Retrieved from the Internet at <URL:http://developer.intel.com/design/bridge/quicklist/dsc-21154.htm>.

*Primary Examiner*—Paul R. Myers
*Assistant Examiner*—Raymond N Phan
(74) *Attorney, Agent, or Firm*—David W. Victor; Konrad Raynes & Victor LLP

(57) ABSTRACT

Provided are a method, system, and program for processing operations in a system including a bus, a target device and devices capable of accessing the target device over the bus. The target device receives a transaction request from one of the devices over the bus and determines whether a delayed read request is pending after receiving the transaction request. The target device issues a command to disconnect the device initiating the transaction request from the bus. The device initiating the transaction request is allowed to reconnect to the bus and complete the transaction request after the delayed read request is completed.

36 Claims, 3 Drawing Sheets

U.S. PATENT DOCUMENTS 6,502,157 B1 * 12/2002 Batchelor et al. ............ 710/310
6,625,683 B1 * 9/2003 Khan et al. ................. 710/313
6,694,397 B2 * 2/2004 Lackey et al. .............. 710/112
6,715,011 B1 * 3/2004 Buckland et al. ........... 710/100
6,742,074 B2 * 5/2004 Jeddeloh ..................... 710/309
2002/0078282 A1 * 6/2002 Drerup et al. .............. 710/107

* cited by examiner

METHOD, SYSTEM, AND PROGRAM FOR PROCESSING TRANSACTION REQUESTS DURING A PENDENCY OF A DELAYED READ REQUEST IN A SYSTEM INCLUDING A BUS, A TARGET DEVICE AND DEVICES CAPABLE OF ACCESSING THE TARGET DEVICE OVER THE BUS

BACKGROUND OF THE INVENTION

1. Field of the Invention

The present invention relates to a method, system, and program for processing transaction requests during a pendency of a delayed read request.

2. Description of the Related Art

The Peripheral Component Interconnect (PCI) bus architecture provides a low latency path through which devices implementing the PCI architecture can communicate. Details of the PCI bus architecture are described in the publication "PCI Local Bus Specification," Revisions 2.2 (December 1998), published by the PCI Special Interest Group, which publication is incorporated herein by reference in its entirety. Each PCI device, also referred to as a bus master or target, that communicates on the PCI bus includes a configuration space including information used to address the device on the PCI bus.

The PCI specification provides for delayed transaction processing. In delayed transactions, the master submitting a read request is disconnected from the bus while the target device accesses and buffers the requested data. The master initiating the read would continually retry the read until the requested data is gathered in the buffer. When the master retries the read request after the target has gathered the requested data, the data will then be returned to the master. In this way, the bus is not held in wait states while the read data is gathered and other devices can access the PCI bus. This is especially important for read requests directed toward slower target devices where the read operation can take longer to complete. In such cases, the delayed read request will avoid the lengthy read operation from occupying the bus and preventing other devices access during the lengthy read.

When multiple masters are connected to the PCI bus, other master requests may take control of the PCI bus for extended periods and prevent the master that was disconnected for the delayed read transaction from accessing the requested read data from the buffer for the extended period. For instance, if after a master disconnects as part of a delayed read transaction, another master can submit a posted write. The master that submitted the read may not reconnect and retrieve the data until the intervening write request has completed. Such delays due to an intervening write can add significant delays to the read request, especially for lengthier writes. A posted write is a write where upon transferring the data to an intermediate agent, such as the target in a PCI device or bridge, the transaction completes at the originating agent before it completes at the intended destination, e.g., the data is written to the target device. This allows the originating agent to proceed with the next transaction while the requested transaction is working its way to the ultimate destination.

In the prior art, the read master can only reconnect after the master write completes the transfer of data across the bus or after a latency timer expires, which effectively places an upper limit on any master's access. After the posted write has completed on the PCI bus or the latency timer has expired, the write master is disconnected and the read master can reconnect to access the buffered data. Such delays to the read request can be extensive if the write request is lengthy. Moreover, the latency timer is often set to a value much longer than the time required for the target to fetch the requested read data, thus causing latency from the time the data is available to when the latency timer expires.

One goal of PCI bus designers is to minimize read latency delays. Read latency is a result of both the delays that occur when accessing the data from the target device and any delays resulting from other masters gaining control of the PCI bus and preventing the delay read master from reconnecting, which occurs in the case of a posted write. If the system performance is particularly sensitive to read latency delays, then the frequent occurrence of such delays may degrade system performance. For these reasons, there is a need in the art to reduce read latency delays that occur when intervening requests, such as posted writes, prevent the master initiating the delayed read transaction from reconnecting to the bus to access the buffered read request data.

SUMMARY OF THE PREFERRED EMBODIMENTS

Provided are a method, system, and program for processing operations in a system including a bus, a target device and devices capable of accessing the target device over the bus. The target device receives a transaction request from one of the devices over the bus and determines whether a delayed read request is pending after receiving the transaction request. The target device issues a command to disconnect the device initiating the transaction request from the bus. The device initiating the transaction request is allowed to reconnect to the bus and complete the transaction request after the delayed read request is completed.

In further implementations, the command to disconnect comprises a retry disconnect that occurs before data subject to the transaction request is transmitted.

Still further, a determination may be made of whether requested data for the delayed read request is accessed and available to return. In such cases, the command to disconnect the device initiating the transaction request is issued after the requested data for the delayed read request is determined to be available to return.

Moreover, the transaction request may be allowed to proceed if the delayed read request is pending and if the requested data for the delayed read request is not available to return.

In still further implementations, a determination is made as to whether a variable indicates a first state or a second state, wherein the state indicated by the variable determines when the target device issues the command to disconnect the device initiating the transaction request while the delayed read request is pending.

Still further, the command to disconnect the device initiating the transaction request is issued when the device attempts to connect to the target device if the variable indicates the first state. The command to disconnect the device initiating the transaction request is issued after all the requested data for the delayed read request is determined to be available to return if the variable indicates the second state.

Described implementations provide techniques for handling transaction requests to a target device that occur while a delayed read request is pending at the target device. With the described implementations, the target device will disconnect from the device initiating the transaction request so that the bus remains available for the delayed read request to reconnect and access the requested data. Such a system minimizes the delayed read latency by preventing another transaction request from blocking the delayed read request from reconnecting when the requested data is available to return.

BRIEF DESCRIPTION OF THE FIGURES

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Figure 1:
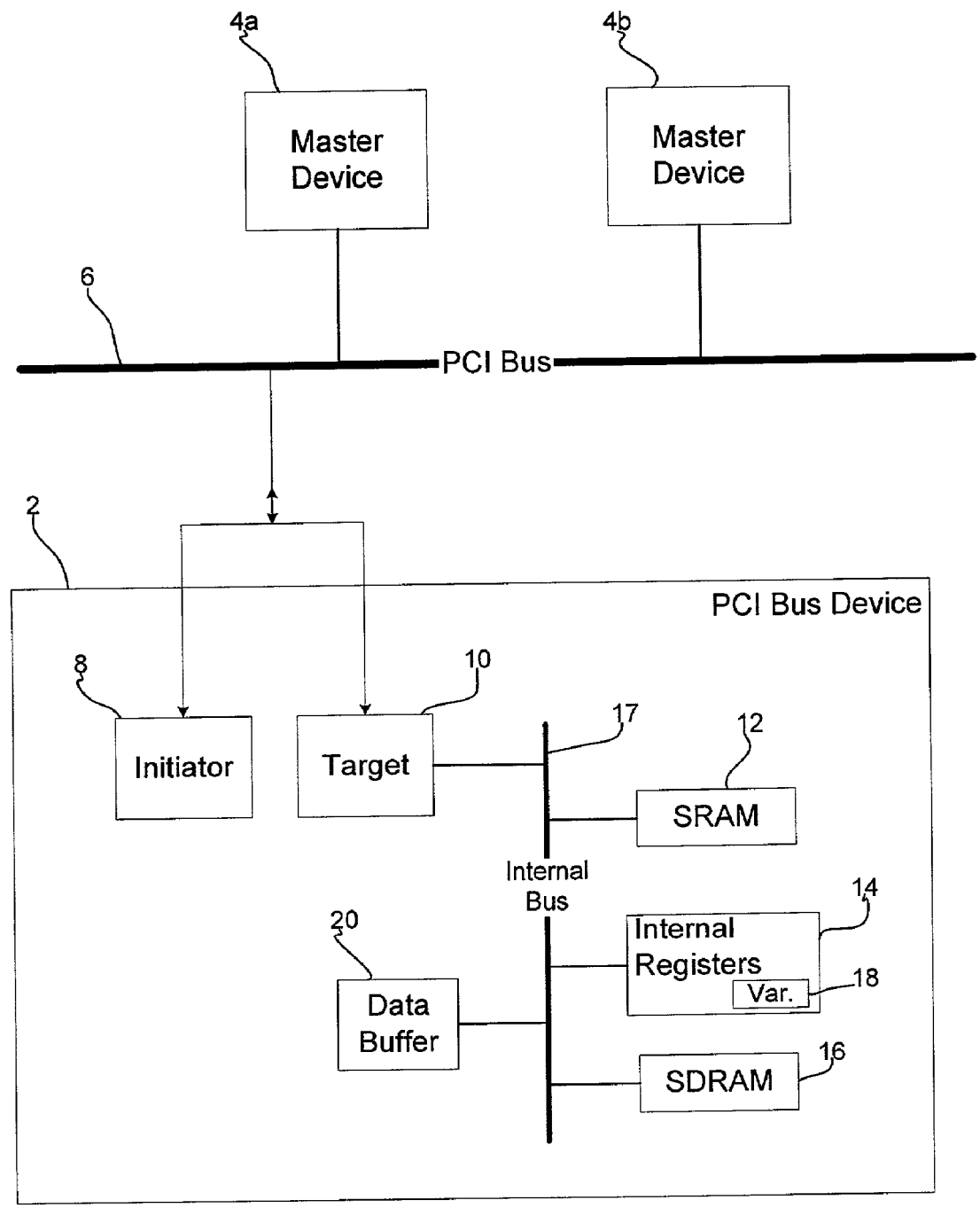
FIG. 1 illustrates a PCI bus architecture in which aspects of the invention are implemented.

FIG. 1 illustrates a PCI bus device 2 in which aspects of the invention are implemented. PCI master devices 4a and 4b can communicate on the PCI bus 6 to initiate requests to any of the memory regions within the PCI bus device 2 or any further downstream targets and receive requests from other devices. Although only two master devices 4a, 4b are shown, there may be additional master devices connected to the PCI bus 6, as well as other non-master bus devices. For instance, the PCI bus device 2 may be part of a PCI-to-PCI bridge where other devices connected to another PCI bus device (not shown) can communicate requests to the PCI bus device 2 over another PCI local bus (not shown) directed to one of the masters 4a, 4b.

The PCI bus device 2 includes initiator 8 hardware to send read and write requests to other PCI devices, such as masters 4a, 4b or any other PCI device over the PCI bus 6. The PCI bus device target 10 comprises hardware to receive read and write requests asserted on the PCI bus 6 that are addressed toward the address space of the PCI device 2.

The PCI bus device 2 is configured to have target base addresses that define addressable locations in memory components accessible through the target 10, including a Static Random Access Memory (SRAM) 12, internal registers 14, and Synchronous Dynamic Random Access Memory (SDRAM) 16. In certain implementations, the target 10 communicates with the memory components 12, 14, 16 via an internal bus 17. The internal registers 14 include a delayed read response mode variable 18 that indicates a state of how delayed transactions are handled by the target 10. The state value for the variable 18 may be set during initialization or in response to a user entered specified state command that occurs as part of configuration or after configuration during operations of the PCI bus device 2. The registers 14 may include the configuration space for the target 10. The target 10 would buffer requested data that is accessed from the memory components 12, 14, and 16 in data buffer 20 to return to requesting devices, such as the master devices 4a, 4b. For delayed read transactions, after disconnecting, the target 10 would buffer the accessed read data in the data buffer 20. When the master 4a, 4b or other bus device initiating the read later reconnects to the target 10, the target 10 would then return the data from the data buffer 20 to complete the read transaction.

Figure 2:
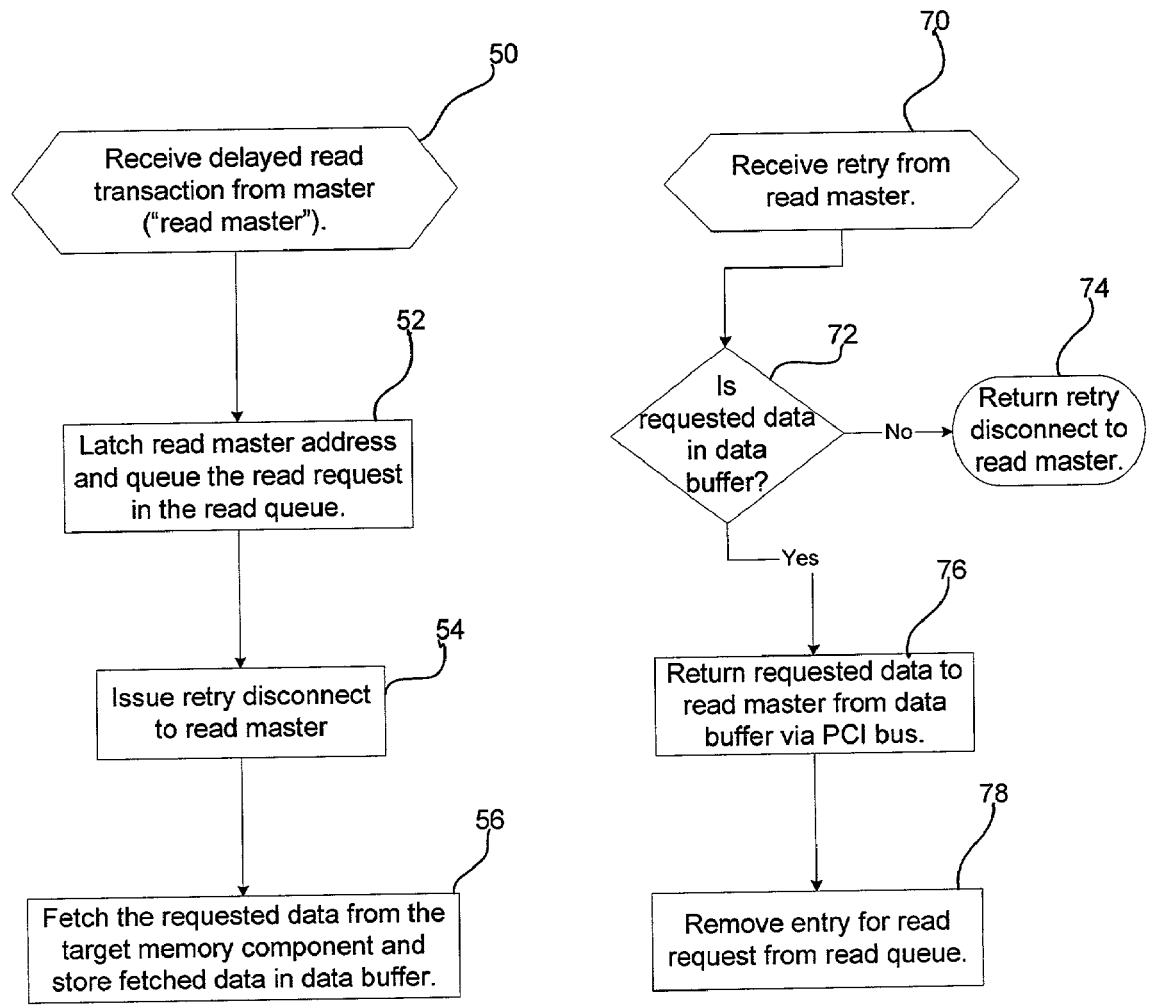
FIGS. 2 and 3 illustrate logic to process transaction requests in accordance with implementations of the invention.

FIG. 2 illustrates logic implemented in the target 10 to process delayed read transactions. Control begins at block 50 upon receiving a delayed read transaction from a master 4a, 4b, referred to as the "read master". Certain regions of the memory components 12, 14, and 16 that have particularly long access times, such as the SDRAM 16, are designated as delayed read regions. All read requests directed to a delayed read region will be processed as a delayed read transaction to disconnect the read master from the PCI bus 6. The purpose is to prevent transactions which have longer latency from occupying the PCI bus 6 and preventing other devices from accessing the bus 6. Other memory address regions in the target 10 may not be designated as delayed read regions. The target 10 can concurrently process read/write requests to different regions. The target 10 will latch (at block 52) the address of the read master and queue the read request in a read queue (not shown). The target 10 then issues (at block 54) a retry disconnect to the read master and proceeds to fetch (at block 56) the requested data into the data buffer 20.

Upon receiving (at block 70) a retry from the read master, if (at block 72) the requested data is not yet in the data buffer 20, then the target 10 returns (at block 74) a retry disconnect to the read master. Otherwise, if the requested data is available, then target 10 returns (at block 76) the requested data from the data buffer 20 via the PCI bus 6 and removes (at bock 78) the entry in the read queue for the delayed read transaction.

Figure 3:
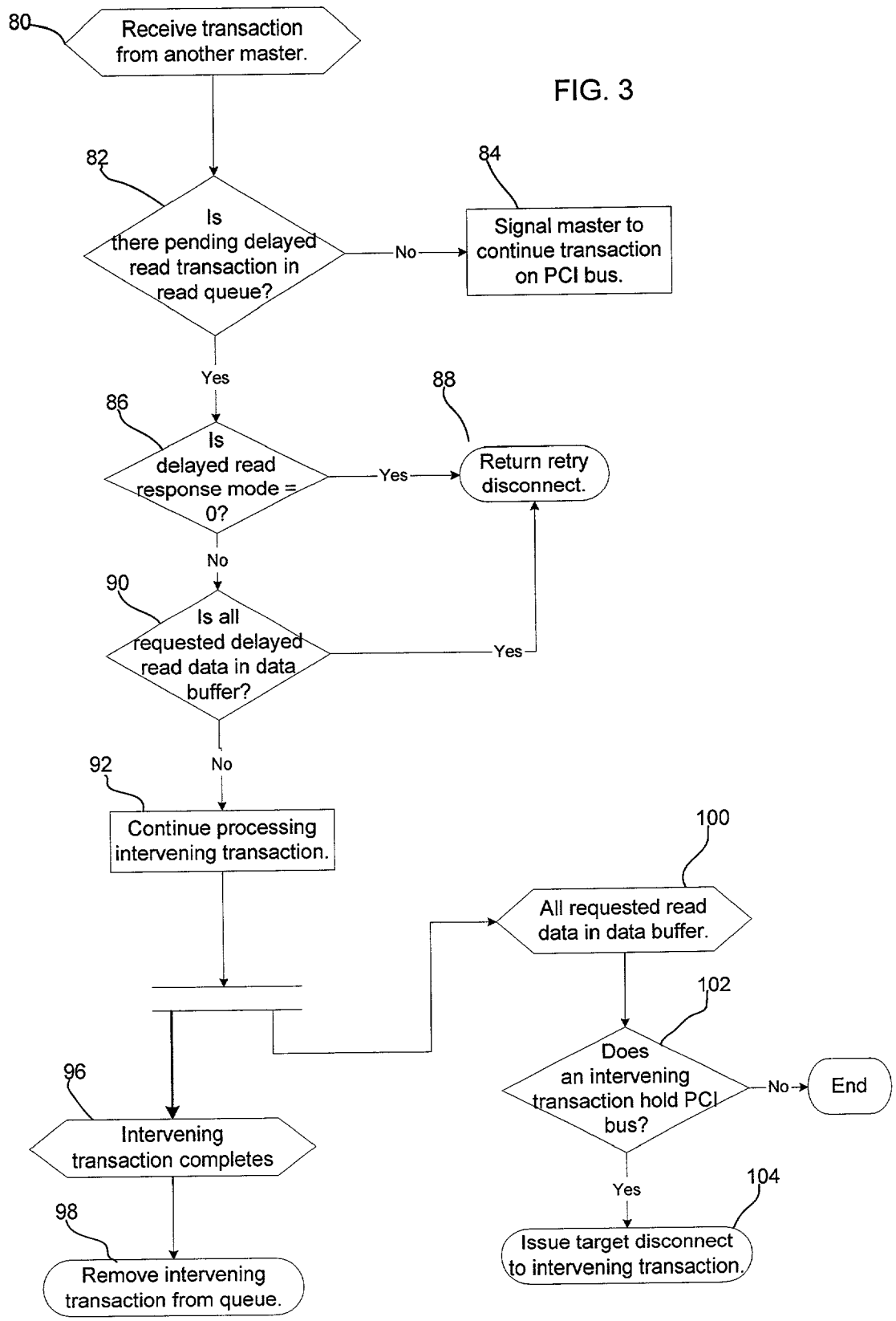

FIG. 3 illustrates logic implemented in the target 10 to handle an intervening transaction, such as a posted write, non-posted write, read, etc., that occurs during a pending delayed read transaction depending in accordance with implementations of the invention. The operations the target 10 performs are based on the delayed read response mode variable 18 value, which may indicate one of two states, where each state specifies a particular mode for handling intervening transactions during the pendency of a delayed read transaction. Control begins at block 80 where the target 10 receives a transaction request from another device. This transaction may comprise a read or write request, such as a posted write request. If (at block 82) there is no pending delayed read transaction, then the target 10 signals (at block 84) the master 4a, 4b initiating the transaction, which may comprise any PCI transaction (e.g., a posted write, non-posted write, read request, etc.) to continue with the transaction. If the transaction is a new transaction, then the target 10 would continue the transaction by performing whatever operations beginning the transaction entails, receiving writes, reading data from memory components 12, 14, 16, forwarding the request to a secondary PCI bus, etc. If the transaction is a reconnect of a previously disconnected transaction, then continuing the transaction may comprise returning buffered data to a delayed read request or otherwise continuing with a previously discontinued transaction. Otherwise, if (at block 82) there is a delayed read transaction in the read queue and if (at block 86) the delayed read response mode variable 8 indicates the first state, which may correspond to a value of zero as shown in FIG. 2, then the target 10 returns (at block 88) a retry disconnect to the intervening transaction. The retry disconnect causes the intervening master to continually retry the read/write request. After the delayed read has completed, then the disconnected transaction may reconnect to perform the intervening transaction.

With the first state technique, read latency is reduced because the intervening transaction will not hold the PCI bus 6 and prevent the delayed read from immediately accessing the requested data once the data is available in the data buffer 20. The target 10 leaves the PCI bus 6 open for the delayed read to reconnect and retrieve the requested read data from the data buffer 20. Further, because in most cases, the time needed to retrieve the data from the data buffer 20 is substantially shorter than the time needed to complete the intervening transaction, such as receiving write data from a posted or non-posted write, accessing and transmitting data for a read to a memory region that is not a delayed read region, i.e., a faster access memory region, any delays to the intervening transaction are offset by improvements to processing the delayed read. In fact, making the intervening transaction wait for the delayed read to gather the requested data from the data buffer 20 may result in a delay that is significantly shorter than making the delayed read wait to for the intervening transaction to complete by transmitting data over the PCI bus 6 or accessing and reading data for the intervening transaction.

If (at block 86), the delayed read response mode 18 was for a second state handling, which may correspond to a value of one, then the target 10 would first check (at block 90) if all the requested delayed read data is in the data buffer 20. If so, then the target 10 would return a retry disconnect to the intervening master in order to leave the PCI bus 6 open so that the delayed read master 4a, 4b may immediately retrieve the requested data that is available in the data buffer 20. Otherwise, if (at block 90) all the requested delayed read data is not available in the data buffer 20, then the target 10 would continue processing (at block 92) the intervening transaction. At the point at block 92, the intervening transaction can perform read/write on the PCI bus 6 without adversely affecting the delayed read latency because the read master 4a, 4b would not be able to gather the requested data because the requested data is not available in the data buffer 20.

From block 92, one of two separate events may occur while the target 10 is processing the intervening transaction, the intervening transaction completes (at block 96) or the data buffer 20 becomes filled (at block 100) with all the requested delayed read data. At block 96, the intervening transaction completes and, in response, the target 10 removes (at block 98) the intervening transaction from a transaction queue, such as a read or write queue (not shown). At block 100, all the requested data for the delayed read transaction is added to the data buffer 20. In response, if (at block 102), another intervening transaction is in progress reading or writing data, then the target 10 issues (at block 104) a target disconnect to the transaction request; otherwise, control ends.

Issuing the target disconnect at block 104 interrupts the intervening transaction to force the intervening transaction off the PCI bus 6 so that the read master may immediately gather the requested delayed read data in the data buffer 20 the next time the delayed read master retries to reconnect to access the read data. In this way, the delayed read latency is minimized because once the requested data is available, the read master may immediately gather the data without having to wait for the intervening transaction to release the bus 6.

In certain implementations, if the intervening transaction is another delayed read transaction, then that delayed read transaction will be allowed to gather the requested data in the data buffer 20 and not receive the retry disconnect at block 88 or 104 in order to minimize delayed read latency across all delayed read transactions. In such case, the logic to keep the PCI bus 6 available for a delayed read whose data is available in the data buffer 6 applies only to non-delayed read intervening transactions. In yet further implementations, if data for one delayed read request is in the data buffer 20, the target 10 will only keep the PCI bus 6 open against other delayed read requests that have lower priority, i.e., have not yet been queued or are queued at a lower priority than another delayed read transaction. Thus, for the first state implementation, a delayed read that is retrying to access data available in the data buffer 20 may reconnect only if there is no higher priority delayed read in the read queue. For the second state implementation, a delayed read of lower priority accessing data from the data buffer 20 may be interrupted and disconnected if the data for a delayed read having higher priority becomes available in the data buffer 20. Alternatively, the delayed read, even of lower priority, may be allowed to complete accessing the requested data without interruption.

The described implementations provide techniques to minimize the delayed read latency by ensuring that the PCI bus 6 is free for a delayed read transaction to reconnect and collect data gathered in the data buffer 20. Such implementations substantially improve delayed read performance and reduce delayed read latency in situations where a lengthy intervening transaction, such as a long posted write, would otherwise be allowed to remain connected to the bus during the transaction and prevent a delayed read from reconnecting to access requested read data available in the data buffer.

ADDITIONAL IMPLEMENTATION DETAILS

The described logic for processing transactions may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as a magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

In the described implementations, the PCI architecture may include additional PCI devices and bridges other than those shown in FIG. 1.

The described bus and bus devices implemented the PCI architecture. However, in alternative interface implementations, bus and bridge technology known in the art other than PCI may be used to implement the bridge and bus interfaces.

In the described implementations, the target issued command such as a retry disconnect or target disconnect to prevent other transactions from occupying the PCI bus. In alternative implementations, different commands may be used to cause the requesting device to disconnect from the bus.

Certain logic was described as being performed by specific components, such as the target, etc. Notwithstanding, operations described as being implemented within specific components may be implemented elsewhere.

In the described implementations, the target determined from the delayed read response mode variable 18 (FIG. 1) the operations to perform to prevent another intervening request from occupying the PCI bus. In alternative implementations, the target may simply be coded to perform one of the first or second state operations. In such cases, no read response mode variable is needed.

In the described implementations, the requested memory regions were located within the PCI bus device. Alternatively, the target memory regions may be external to the PCI bus device.

In the described implementations, the I/O transaction were directed to memory regions. In alternative implementations, the I/O transactions may comprise a request to any type of Input/Output device known in the art, such as a hard disk drive, tape, printer, display monitor, audio amplifier, etc.

The preferred logic of FIGS. 2 and 3 describe specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel.

The foregoing description of the described implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing operations in a system including a bus, a target device and devices capable of accessing the target device over the bus, wherein the target device performs:
   receiving a write request from one of the devices over the bus;
   determining whether a delayed read request is pending after receiving the write request;
   issuing a command to disconnect the device initiating the write request from the bus in response to determining that the delayed read request is pending; and
   allowing the device initiating the write request to reconnect to the bus and complete the write request after the delayed read request is completed.

2. The method of claim 1, wherein the delayed read request is directed toward a first memory region and the write request is directed toward a second memory region.

3. The method of claim 1, wherein the command to disconnect comprises a retry disconnect that occurs before data subject to the write request is transmitted.

4. The method of claim 1, further comprising:
   determining whether requested data for the delayed read request is available to return, wherein the command to disconnect the device initiating the write request is issued after the requested data for the delayed read request is determined to be available to return.

5. The method of claim 1, wherein the bus, target device, and devices communicate using the Peripheral Component Interconnect (PCI) protocol, and wherein the devices that initiate the delayed read request and write request comprise master devices for the bus.

6. The method of claim 1, further comprising;
   determining whether a variable indicates a first state or a second state, wherein the state indicated by the variable determines when the target device issues the command to disconnect the device initiating the write request while the delayed read request is pending.

7. The method of claim 1, wherein write request and delayed read request are initiated from different devices.

8. The method of claim 2, wherein the first and second memory regions are implemented within the target device.

9. The method of claim 6, further comprising:
   issuing the command to disconnect the device initiating the write request when the device that initiated the delayed read request attempts to reconnect to the target device if the variable indicates the first state; and
   issuing the command to disconnect the device initiating the write request after all the requested data for the delayed read request is determined to be available to return if the variable indicates the second state.

10. The method of claim 9, further comprising;
    allowing the write request to proceed during a time at which all the requested data for the delayed read request is not available to return if the variable indicates the second state.

11. A method for processing operations in a system including a bus, a target device and devices capable of accessing the target device over the bus, wherein the target device performs:
    receiving a transaction request from one of the devices over the bus;
    determining whether a delayed read request is pending after receiving the transaction request;
    determining whether requested data for the delayed read request is available to return;
    issuing a command to disconnect the device initiating the transaction request from the bus in response to determining that the delayed read request is pending and the requested data for the delayed read request is determined to be available to return;
    allowing the device initiating the transaction request that was disconnected in response to the command to reconnect to the bus and complete the transaction request after the delayed read request is completed; and
    allowing the transaction request to proceed if the delayed read request is pending and if the requested data for the delayed read request is not available to return.

12. The method of claim 11, further comprising:
    after allowing the transaction request to proceed, determining that all the requested data is available to return, wherein the command to disconnect is issued after determining that all the requested data is available to return after allowing the transaction request to proceed.

13. The method of claim 12, wherein the transaction request will attempt to reconnect to the target device to complete an unfinished portion of the transaction request that did not complete as a result of the issuing of the command to disconnect.

14. The method of claim 13, wherein the transaction request comprises a write request, wherein the target device receives write data while the delayed read request is pending and the requested data is not available to return, wherein the device issuing the write request will transmit that portion of the write data not sent as a result of the issuing of the command to disconnect during a subsequent reconnect to the target device.

15. A system for processing operations in communication with devices, comprising:
   a target device;
   a bus, wherein the devices are capable of accessing the target device over the bus;
   means for receiving a write request from one of the devices over the bus;
   means for determining whether a delayed read request is pending after receiving the write request;
   means for issuing a command to disconnect the device initiating the write request from the bus in response to determining that the delayed read request is pending; and
   means for allowing the device initiating the write request to reconnect to the bus and complete the write request after the delayed read request is completed.

16. The system of claim 15, further comprising:
   a first memory region; and
   a second memory region, wherein the delayed read request is directed toward the first memory region and the write request is directed toward the second memory region.

17. The system of claim 15, further comprising:
   means for determining whether requested data for the delayed read request is available to return, wherein the command to disconnect the device initiating the write request is issued after the requested data for the delayed read request is determined to be available to return.

18. The system of claim 15, wherein the bus, target device, and devices communicate using the Peripheral Component Interconnect (PCI) protocol.

19. The system of claim 15, further comprising;
   means for determining whether a variable indicates a first state or a second state, wherein the state indicated by the variable determines when the target device issues the command to disconnect the device initiating the write request while the delayed read request is pending.

20. A system for processing operations in communication with devices, comprising:
   a target device;
   a bus, wherein the devices are capable of accessing the target device over the bus;
   means for receiving a transaction request from one of the devices over the bus;
   means for determining whether a delayed read request is pending after receiving the transaction request;
   means for issuing a command to disconnect the device initiating the transaction request from the bus in response to determining that the delayed request is pending and the requested data for the delayed read request is determined to be available to return;
   means for allowing the transaction request to proceed if the delayed read request is pending and if the requested data for the delayed read request is not available to return;
   means for allowing the device initiating the transaction request that was disconnected in response to the command to reconnect to the bus and complete the transaction request after the delayed read request is completed; and
   means for allowing the transaction request to proceed if the delayed read request is pending and if the requested data for the delayed read request is not available to return.

21. The system of claim 20, further comprising:
   means for determining that all the requested data is available to return after allowing the transaction request to proceed, wherein the command to disconnect is issued after determining that all the requested data is available to return after allowing the transaction request to proceed.

22. The system of claim 21, wherein the transaction request will attempt to reconnect to the target device to complete an unfinished portion of the transaction request that did not complete as a result of the issuing of the command to disconnect.

23. An article of manufacture including code for processing operations in a system including a bus, a target device and devices capable of accessing the target device over the bus, wherein the code causes the target device to perform:
   receiving a write request from one of the devices over the bus;
   determining whether a delayed read request is pending after receiving the write request;
   issuing a command to disconnect the device initiating the write request from the bus in response to determining that the delayed read request is pending; and
   allowing the device initiating the write request to reconnect to the bus and complete the write request after the delayed read request is completed.

24. The article of manufacture of claim 23, wherein the delayed read request is directed toward a first memory region and the write request is directed toward a second memory region.

25. The article of manufacture of claim 23, wherein the command to disconnect comprises a retry disconnect that occurs before data subject to the write request is transmitted.

26. The article of manufacture of claim 23, further comprising:
   determining whether requested data for the delayed read request is available to return, wherein the command to disconnect the device initiating the write request is issued after the requested data for the delayed read request is determined to be available to return.

27. The article of manufacture of claim 23, wherein the bus, target device, and devices communicate using the Peripheral Component Interconnect (PCI) protocol, and wherein the devices that initiate the delayed read request and write request comprise master devices for the bus.

28. The article of manufacture of claim 23, further comprising:
   determining whether a variable indicates a first state or a second state, wherein the state indicated by the variable determines when the target device issues the command to disconnect the device initiating the write request while the delayed read request is pending.

29. The article of manufacture of claim 23, wherein the write request and the delayed read request are initiated from different devices.

30. The article of manufacture of claim 24, wherein the first and second memory regions are implemented within the target device.

31. The article of manufacture of claim 28, further comprising:

issuing the command to disconnect the device initiating the write request when the device that initiated the delayed read request attempts to reconnect to the target device if the variable indicates the first state; and issuing the command to disconnect the device initiating the write request after all the requested data for the delayed read request is determined to be available to return if the variable indicates the second state.

32. The article of manufacture of claim 31, further comprising:

allowing the write request to proceed during a time at which all the requested data for the delayed read request is not available to return if the variable indicates the second state.

33. An article of manufacture including code for processing operations in a system including a bus, a target device and devices capable of accessing the target device over the bus, wherein the code causes the target device to perform:

receiving a transaction request from one of the devices over the bus;

determining whether a delayed read request is pending after receiving the transaction request;

determining whether requested data for the delayed read request is available to return;

issuing a command to disconnect the device initiating the transaction request from the bus in response to determining that the delayed read request is pending and the requested data for the delayed read request is determined to be available to return;

allowing the device initiating the transaction request that was disconnected in response to the command to reconnect to the bus and complete the transaction request after the delayed read request is completed; and allowing the transaction request to proceed if the delayed read request is pending and if the requested data for the delayed read request is not available to return.

34. The article of manufacture of claim 33, further comprising:

after allowing the transaction request to proceed, determining that all the requested data is available to return, wherein the command to disconnect is issued after determining that all the requested data is available to return after allowing the transaction request to proceed.

35. The article of manufacture of claim 34, wherein the transaction request will attempt to reconnect to the target device to complete an unfinished portion of the transaction request that did not complete as a result of the issuing of the command to disconnect.

36. The article of manufacture of claim 35, wherein the transaction request comprises a write request, wherein the target device receives write data while the delayed read request is pending and the requested data is not available to return, wherein the device issuing the write request will transmit that portion of the write data not sent as a result of the issuing of the command to disconnect during a subsequent reconnect to the target device.

* * * * *